US008363810B2

(12) United States Patent
Yoakum et al.

(10) Patent No.: US 8,363,810 B2
(45) Date of Patent: Jan. 29, 2013

(54) METHOD AND SYSTEM FOR AURALLY POSITIONING VOICE SIGNALS IN A CONTACT CENTER ENVIRONMENT

(75) Inventors: John H. Yoakum, Cary, NC (US); Tony McCormack, Galway (IE); John Costello, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 587 days.

(21) Appl. No.: 12/555,413

(22) Filed: Sep. 8, 2009

(65) Prior Publication Data

US 2011/0058662 A1 Mar. 10, 2011

(51) Int. Cl.
*H04M 3/42* (2006.01)
*H04M 1/00* (2006.01)
*H04M 3/00* (2006.01)
*H04M 5/00* (2006.01)
*H04L 12/16* (2006.01)
*H04Q 11/00* (2006.01)

(52) U.S. Cl. ............... 379/202.01; 379/158; 379/242; 370/260; 370/261

(58) Field of Classification Search ............. 379/202.01, 379/242, 265.02, 204.01, 158, 156; 370/260, 370/261; 709/204
See application file for complete search history.

(56) References Cited

U.S. PATENT DOCUMENTS

| 4,650,929 | A | 3/1987 | Boerger et al. |
| 4,734,934 | A | 3/1988 | Boggs et al. |
| 5,020,098 | A | 5/1991 | Celli |
| 5,113,431 | A | 5/1992 | Horn |
| 5,533,112 | A | 7/1996 | Danneels |
| 5,539,741 | A | 7/1996 | Barraclough et al. |
| 5,790,635 | A | 8/1998 | Dezonno |
| 5,889,843 | A | 3/1999 | Singer et al. |
| 6,011,851 | A | 1/2000 | Connor et al. |
| 6,125,115 | A | 9/2000 | Smits |
| 6,178,237 | B1 | 1/2001 | Horn |

(Continued)

FOREIGN PATENT DOCUMENTS

| EP | 0762717 A2 | 3/1997 |
| EP | 1954019 A1 | 8/2008 |

(Continued)

OTHER PUBLICATIONS

Ben Ford, S., et al., "Managing Mutual Awareness in Collaborative Virtual Environments," Proceedings VRST '94, Aug. 1994, ACM Press, Singapore, 14 pages.

(Continued)

*Primary Examiner* — Thjuan K Addy
(74) *Attorney, Agent, or Firm* — Withrow & Terranova, PLLC (57) ABSTRACT

A contact center media server for aurally positioning participants of a contact center transaction at aural positions designated by a contact center agent. The media server includes a communications interface coupled to a controller and adapted to interface with a plurality of voice paths. Each of the voice paths is associated with one of a plurality of participants in a contact center transaction. A three-dimensional (3D) spatializer engine is coupled to the controller and can receive incoming voice signals received over voice paths and corresponding aural position data. The 3D spatializer engine processes the incoming voice signals and generates outgoing voice signals that include signal characteristics that aurally position the first outgoing voice signals at an aural position with respect to the contact center agent indicated by the aural position data.

20 Claims, 9 Drawing Sheets

U.S. PATENT DOCUMENTS

| | | | |
|---|---|---|---|
| 6,219,045 B1 | 4/2001 | Leahy et al. | |
| 6,241,612 B1 | 6/2001 | Heredia | |
| 6,327,567 B1 | 12/2001 | Willehadson et al. | |
| 6,330,022 B1 | 12/2001 | Seligmann | |
| 6,408,327 B1 | 6/2002 | McClennon et al. | |
| 6,501,739 B1 | 12/2002 | Cohen | |
| 6,539,087 B1 | 3/2003 | Walsh et al. | |
| 6,559,863 B1 | 5/2003 | Megiddo | |
| 6,657,975 B1 | 12/2003 | Baxley et al. | |
| 6,675,054 B1 | 1/2004 | Ruberg | |
| 6,807,563 B1 | 10/2004 | Christofferson et al. | |
| 6,813,360 B2 | 11/2004 | Gentle | |
| 6,839,417 B2 | 1/2005 | Weisman et al. | |
| 6,850,496 B1 | 2/2005 | Knappe et al. | |
| 6,879,565 B2 | 4/2005 | Baxley et al. | |
| 6,959,075 B2 | 10/2005 | Cutaia et al. | |
| 6,985,571 B2 | 1/2006 | O'Malley et al. | |
| 7,006,616 B1 | 2/2006 | Christofferson et al. | |
| 7,111,049 B1 | 9/2006 | Granger et al. | |
| 7,180,997 B2 | 2/2007 | Knappe | |
| 7,181,690 B1 | 2/2007 | Leahy et al. | |
| 7,194,084 B2 | 3/2007 | Shaffer et al. | |
| 7,412,392 B1 | 8/2008 | Satapathy | |
| 7,908,320 B2 * | 3/2011 | Ludwig et al. | 709/204 |
| 7,933,226 B2 | 4/2011 | Woodruff et al. | |
| 7,995,732 B2 | 8/2011 | Koch et al. | |
| 2002/0013813 A1 | 1/2002 | Matsuoka | |
| 2002/0020951 A1 | 2/2002 | Choi | |
| 2002/0181721 A1 | 12/2002 | Sugiyama et al. | |
| 2003/0021400 A1 | 1/2003 | Grandgent et al. | |
| 2003/0112947 A1 | 6/2003 | Cohen | |
| 2003/0117531 A1 | 6/2003 | Rovner et al. | |
| 2003/0174657 A1 | 9/2003 | Qin | |
| 2003/0234859 A1 | 12/2003 | Malzbender et al. | |
| 2004/0013252 A1 | 1/2004 | Craner | |
| 2004/0047461 A1 | 3/2004 | Weisman et al. | |
| 2004/0052218 A1 | 3/2004 | Knappe | |
| 2004/0101120 A1 | 5/2004 | O'Malley et al. | |
| 2004/0190700 A1 | 9/2004 | Cutaia et al. | |
| 2004/0240652 A1 | 12/2004 | Kanada | |
| 2005/0062843 A1 | 3/2005 | Bowers et al. | |
| 2005/0181872 A1 | 8/2005 | Acharya et al. | |
| 2005/0271194 A1 | 12/2005 | Woods et al. | |
| 2005/0280701 A1 | 12/2005 | Wardell | |
| 2006/0067500 A1 | 3/2006 | Christofferson et al. | |
| 2006/0104458 A1 | 5/2006 | Kenoyer et al. | |
| 2007/0071204 A1 | 3/2007 | Kanada | |
| 2007/0133436 A1 | 6/2007 | Provino et al. | |
| 2007/0279484 A1 | 12/2007 | Derocher et al. | |
| 2008/0037749 A1 | 2/2008 | Metzger et al. | |
| 2008/0144794 A1 | 6/2008 | Gardner | |
| 2008/0144876 A1 | 6/2008 | Reining et al. | |
| 2008/0260131 A1 | 10/2008 | Akesson | |
| 2009/0086949 A1 | 4/2009 | Caspi et al. | |
| 2009/0220064 A1 | 9/2009 | Gorti et al. | |
| 2010/0020951 A1 | 1/2010 | Basart et al. | |
| 2010/0073454 A1 | 3/2010 | Lovhaugen et al. | |
| 2010/0158203 A1 | 6/2010 | Mikan et al. | |
| 2011/0077755 A1 | 3/2011 | Yoakum et al. | |

FOREIGN PATENT DOCUMENTS

| | | |
|---|---|---|
| GB | 2303516 A | 2/1997 |
| WO | 9941880 A1 | 8/1999 |
| WO | 0048379 A1 | 8/2000 |
| WO | 2004095822 A1 | 11/2004 |
| WO | 2010046736 A1 | 4/2010 |
| WO | 2011036543 A1 | 3/2011 |

OTHER PUBLICATIONS

Damer, B., "Avatars!: Exploring and Building Virtual Worlds on the Internet (excerpts)", Peachpit Press, Berkeley, 1998, 158 pages.

No Author, "Digital Space Traveler User Guide," The Digital Space Commons, Chapters 1-8, http://www.digitalspace.com/traveler/DigitalSpaceTravelerUserGuide.pdf, 46 pages, Submitted on Mar. 15, 2011.

McCarthy, S., "PC users step through their screens via OnLive!," Telephony Online, Sep. 9, 1996, accessed May 27, 2007, http://telephonyonline.com/mag/telecom_pc_users_step/, 2 pages.

No Author, "OnLive! Products," OnLive! Technologies, Inc., accessed May 22, 2007, http://web.archive.org/web/19970714193742/http://www.onlive.com/prod/, 3 pages.

Liesenborgs, J., "Voice over IP in networked virtual environments," Maastricht University Doctoral Thesis, 1999-2000 Academic Year, Title Page, Table of Contents and Chapters 6 and 10, 18 pages.

Eubank, W., "Summer Internet World '97, McCormick Place, Chicago, Illinois, Jul. 21-25, 1997", Aug. 1, 1996, updated Aug. 1, 1997, http://www.eubank-web.com/William/Articles/world97.htm, 5 pages.

No Author, "3D Conferencing White Paper," DiamondWare, May 19, 2005, 7 pages.

No Author, "3D Audio through the Internet," DiamondWare, May 15, 2005, 7 pages.

No Author, "Out With The Old, In With Palantir," DiamondWare, Sep. 28, 2003, 2 pages.

International Search Report for PCT/IB2010/002384 mailed Feb. 2, 2011, 10 pages.

Search Report for United Kingdom Patent Application No. 1119805.8 issued Mar. 14, 2012, 2 pages.

Notice of Allowance for U.S. Appl. No. 12/564,262 mailed Nov. 25, 2011, 10 pages.

Non-final Office Action for U.S. Appl. No. 12/564,262 mailed Aug. 16, 2011, 7 pages.

Non-final Office Action for U.S. Appl. No. 11/233,773 mailed Oct. 25, 2011, 37 pages.

Advisory Action for U.S. Appl. No. 11/233,773 mailed Aug. 9, 2011, 3 pages.

Final Office Action for U.S. Appl. No. 11/233,773 mailed Jun. 6, 2011, 42 pages.

Non-final Office Action for U.S. Appl. No. 11/233,773 mailed Dec. 28, 2010, 38 pages.

Advisory Action for U.S. Appl. No. 11/233,773 mailed Nov. 9, 2010, 3 pages.

Final Office Action for U.S. Appl. No. 11/233,773 mailed Jun. 22, 2010, 37 pages.

Non-final Office Action for U.S. Appl. No. 11/233,773 mailed Oct. 28, 2009, 38 pages.

Final Office Action for U.S. Appl. No. 11/233,773 mailed May 11, 2009, 34 pages.

Non-final Office Action for U.S. Appl. No. 11/233,773 mailed Sep. 16, 2008, 31 pages.

Final Office Action for U.S. Appl. No. 11/983,616 mailed Apr. 11, 2012, 17 pages.

Non-final Office Action for U.S. Appl. No. 11/983,616 mailed Sep. 28, 2011, 14 pages.

Final Office Action for U.S. Appl. No. 11/233,773 mailed Jun. 27, 2012, 49 pages.

Non-final Office Action for U.S. Appl. No. 12/569,931 mailed Aug. 3, 2012, 16 pages.

Non-final Office Action for U.S. Appl. No. 12/887,734 mailed Sep. 4, 2012, 15 pages.

Non-final Office Action for U.S. Appl. No. 12/948,140 mailed Oct. 24, 2012, 18 pages.

* cited by examiner

METHOD AND SYSTEM FOR AURALLY POSITIONING VOICE SIGNALS IN A CONTACT CENTER ENVIRONMENT

FIELD OF THE INVENTION

The present invention relates to contact centers, and in particular to positioning voice signals of participants in a contact center transaction at aural positions designated by a contact center agent.

BACKGROUND OF THE INVENTION

Humans detect a location of a sound through differences in the phase and frequency of sound waves that are received simultaneously by each ear. Many electronic voice communications are monaural, and thus there is no ability for a listener to distinguish a particular location, or position, of a voice in relation to their own perspective. This is apparent, for example, in a voice conference where a listener may hear multiple individuals speaking concurrently, and to the listener, each individual sounds as if they are at the same location. Studies have shown it is difficult for the human brain to assimilate multiple concurrent conversations in a monaural environment.

Use of stereo headsets or multiple speakers in conjunction with multi-channel audio signals enables different audio signals to be received by each ear. Multi-channel sound is used in certain applications, such as computer gaming environments and virtual reality environments, to enable a participant to distinguish a general location of sounds occurring during participation in the environment.

Commercial enterprises frequently use contact centers to provide information, such as technical support information, to customers. A caller may dial a telephone number associated with a manufacturer of a product, answer certain questions posed by an interactive voice response system, and then be routed to a particular contact center agent based on the caller's answers. The contact center agent begins a dialog with the caller. During the course of the transaction, the contact center agent may find it necessary to engage other individuals to resolve the caller's particular issue. For example, the contact center agent may feel compelled to engage a contact center supervisor, one or more subject matter experts, another contact center agent that has encountered similar issues, and the like. Because the caller's voice signals and those of the other individuals are typically monaural, connecting all of the participants together in a single conference, even if possible, may make it difficult for the contact center agent to manage because each of the participants sound as if they are at the same location. One way to prevent this difficulty is for the contact center agent to put the caller on 'hold' while engaging the other individuals in one or more separate conversations. However, customers frequently object to being placed on hold during a telephone call. Moreover, the caller may have additional data that may be useful to the contact center agent and the other individuals engaged by the contact center agent while they are discussing the issue. Thus, it would be desirable if the contact center agent could join some or all of the participants together in a conference, and otherwise control the communication interactions between the participants, as well as easily determine who is speaking based on a unique aural position of each individual's voice. It would also be desirable if the contact center agent could have private conversations with, or listen to input being privately provided to the contact center agent from other resources, while still being able to hear the caller. Thus, it would be desirable in a number of different ways if a contact center agent could aurally position the voice signals of participants in a contact center transaction at desired aural positions with respect to the contact center agent.

SUMMARY OF THE INVENTION

The present invention relates to aurally positioning voice signals of different participants of a contact center transaction at different aural positions with respect to a contact center agent, while concurrently controlling which participants in the contact center transaction can hear which other participants. A contact center media server anchors the contact center transaction and includes a communication interface adapted to communicate with a plurality of different voice paths. Each voice path may carry incoming voice signals associated with a participant of the contact center transaction. Typically, but not necessarily, the incoming voice signals associated with each participant are monaural voice signals. The contact center media server includes, or is coupled to, a three-dimensional (3D) spatial audio engine (3DSAE) that is adapted to receive incoming voice signals associated with each participant's voice, and generate outgoing multi-channel voice signals which include audio characteristics that position each participant's voice at an aural position based on aural position data designated by the contact center agent. The outgoing voice signals generated by the 3DSAE are provided to the contact center agent, who uses a multi-channel capable output device, such as a stereo headset, to receive the outgoing voice signals. The contact center agent can easily discern which of several participants of the contact center transaction is speaking based on the aural position of the respective participant's voice.

The contact center agent may manipulate a user interface that displays a positioning window representing an area, or volume, with respect to the contact center agent and a participant icon for each participant of the contact center transaction. The contact center agent may select a participant icon with an input device and move, or drag, the icon from a first position within the positioning window to a second position within the positioning window to aurally reposition the voice signals associated with the participant from the first position to the second position with respect to the contact center agent.

Based on the contact center agent's manipulation of the participant icon, the user interface provides control signals to the 3DSAE indicating the position of the participant icon in the positioning window with respect to an agent position in the positioning window representing the contact center agent. The agent position may be represented in the user interface via an agent icon in the positioning window. The control signals provided to the 3DSAE may include, for example, an angle and a loudness identifying the position of the participant icon with respect to the agent position representing the contact center agent.

The contact center media server may also include a conference bridge, or mixer, that enables the contact center agent to dynamically join one or more participants of the contact center transaction to a conference such that each participant in the conference can hear the other participants in the conference. The contact center agent may also choose not to join another participant of the transaction, such as a supervisor, to the conference, and may maintain a separate "whisper" conversation with the supervisor such that the participants of the conference cannot hear the conversation between the contact center agent and the supervisor.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to aurally positioning voice signals of different participants of a contact center transaction at different aural positions with respect to a contact center agent, while concurrently controlling which participants in the contact center transaction can hear other participants. A contact center media server anchors the contact center transaction and includes a communication interface adapted to communicate with a plurality of different voice paths. Each voice path may carry incoming voice signals associated with a participant of the contact center transaction. Typically, but not necessarily, the incoming voice signals associated with each participant are monaural voice signals. The contact center media server includes, or is coupled to, a three-dimensional (3D) spatial audio engine (3DSAE) that is adapted to receive incoming voice signals associated with each participant's voice, and generate outgoing multi-channel voice signals, which include audio characteristics that position each participant's voice at an aural position based on aural position data designated by the contact center agent. The outgoing voice signals generated by the 3DSAE are provided to the contact center agent, who uses a multi-channel capable output device, such as a stereo headset, to receive the outgoing voice signals. The contact center agent can easily discern which of several participants of the contact center transaction is speaking based on the aural position of the respective participant's voice.

Figure 1:
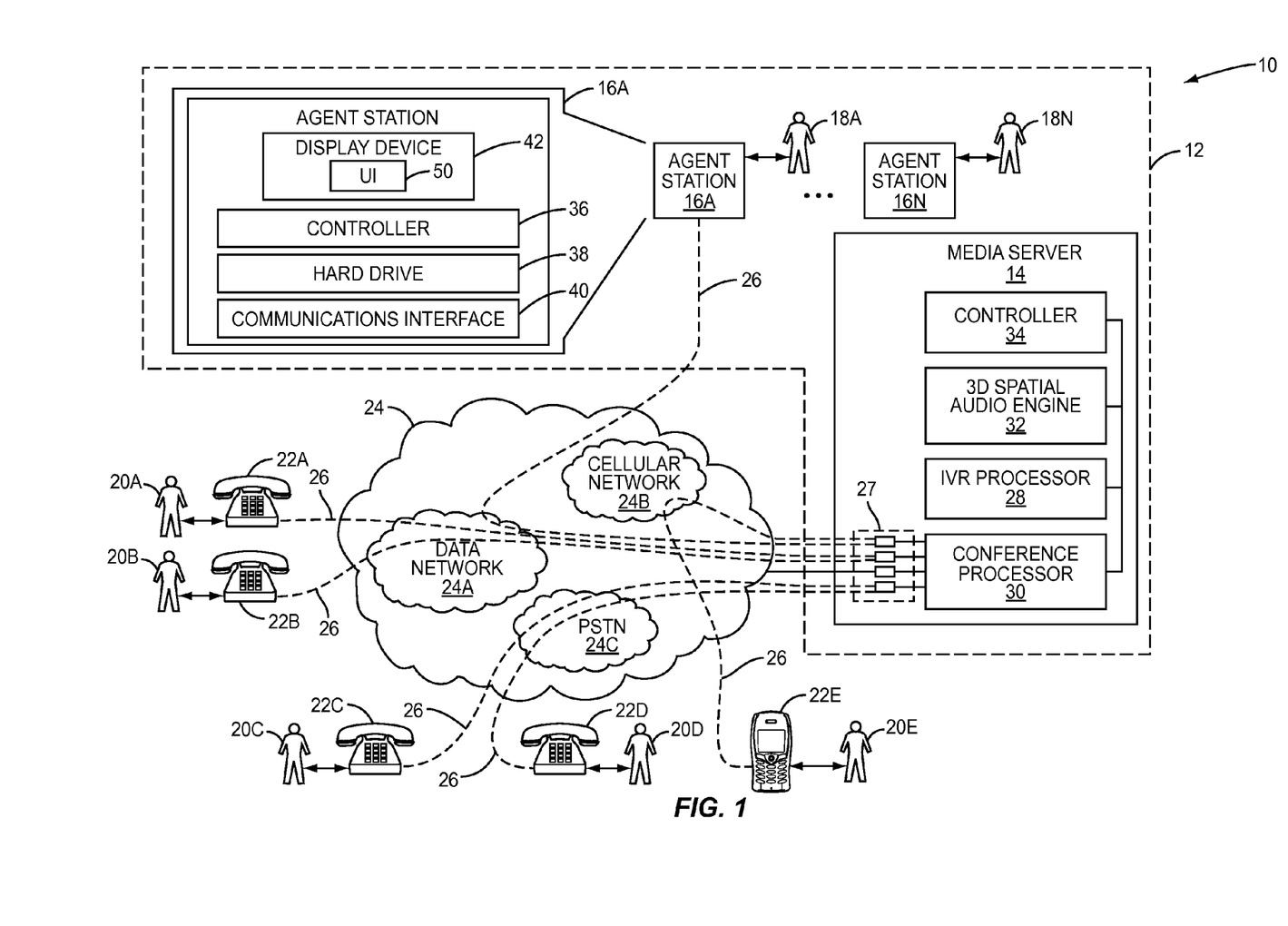
FIG. 1 is a block diagram illustrating a system including a contact center media server and a contact center agent station according to one embodiment of the invention.

FIG. 1 is a block diagram illustrating an environment 10 in which the present invention may be utilized. The environment 10 includes a contact center 12, which typically includes one or more contact center media servers 14, hereinafter referred to as a media server 14, and a plurality of contact center agent stations 16, each operated by a respective contact center agent 18. Hereinafter the contact center agent station 16 will be referred to as the agent station 16.

The contact center 12 may handle simultaneous calls from many different callers 20. As is understood, contact centers are used in a wide variety of applications, and in particular are widely used to provide product support to purchasers of a company's products. A call handled in the contact center 12 by the contact center agent 18 will be referred to herein as a contact center transaction. Each individual participating in the contact center transaction, such as the caller 20 that initiated the contact center transaction, the contact center agent 18 that manages the contact center transaction, and additional individuals who, as discussed in greater detail herein, may be brought into the contact center transaction by the contact center agent 18, will be referred to herein as a participant of the contact center transaction. As will be described in greater detail herein, a particular agent station 16 may be operated by any of several different types of contact center agents 18, including a contact center agent responsible for handling the contact center transaction, a subject matter expert (SME) contact center agent that may be brought into a contact center transaction by the contact center agent handling the transaction to help resolve a particular problem, a supervisor contact center agent, a training contact center agent, and the like.

When the caller 20 initiates a call from a communications device 22 to a designated telephone number of the contact center 12, the call is routed through one or more communication networks 24 to the media server 14 associated with the designated telephone number. Such communication networks 24 can comprise any infrastructure suitable for establishing communication sessions between respective communication devices 22 and the media server 14. For example, a data communication network 24A may be used if communication devices 22A and 22B comprise voice over Internet protocol communication devices, a cellular communication network 24B may be used if communication device 22E comprises a cell phone, and a public switched telephone network (PSTN) 24C may be used if the communication devices 22C and 22D comprise analog or digital telephones. While not illustrated in FIG. 1, such calls may go through multiple other devices associated with a particular type of communication network 24, such as switches, call servers, concentrators, or gateways, and the like, as is known to those skilled in the art. While depicted as telephones in FIG. 1, communication devices 22 may comprise any device capable of processing voice signals, including wired and wireless telephones, cellular telephones, PDAs, computers with audio processing capabilities, and the like.

As the media server 14 begins to process a respective incoming call, a voice path 26 is established between the communications device 22 which initiated the call, and the media server 14. The phrase "voice path" is used herein to describe a path by which voice signals are carried between a participant of a contact center transaction and the media server 14, irrespective of the underlying physical infrastructure used to carry the voice signals, or a particular protocol used to establish the voice path 26 between the respective communication device 22 and the media server 14. The voice path 26 may be implemented in any type of media stream, including audio or video media streams, for example. The particular mechanisms for establishing the voice paths 26 may include, for example, Session Initiation Protocol (SIP), conventional PSTN voice paths, or any other suitable mechanism for establishing voice paths 26. While a telephone number is used as an example by which a communication device 22 can initiate a voice path 26 with the media server 14, any suitable addressing mechanism may be used. For example, if SIP is used to establish the voice path 26, the addressing mechanism may be an SIP address.

The phrase "incoming voice signals" will refer to voice signals generated by a participant in a contact center transaction, such as the caller 20 or the contact center agent 18, which are carried over a voice path 26 to the media server 14. Voice signals are typically carried in a media stream between a respective communications device 22 and the media server 14, and may be analog or digital. The media stream may carry either monaural voice signals, as is likely in certain environments such as the PSTN 24C, or may carry multi-channel voice signals where the media stream is generated via a multi-channel capable device, such as a computer. The phrase "outgoing voice signals" will refer to voice signals carried over a voice path 26 from the media server 14 to a participant in a contact center transaction, such as the caller 20 or the contact center agent 18.

The media server 14 includes a communications interface 27 that interfaces with the voice paths 26. The communications interface 27 can comprise any suitable combination of hardware and or software necessary to receive the incoming voice signals from the voice paths 26 and send the outgoing voice signals over the respective voice paths 26. For example, the communications interface 27 could comprise line cards if the voice paths 26 carry analog voice signals, or could comprise Ethernet circuitry if the voice paths 26 carry packetized voice signals. The media server 14 may also include an interactive voice recognition (IVR) processor 28 for automating routing of an incoming call to a particular contact center agent 18. For example, upon receiving a new incoming call, the IVR processor 28 may be programmed to ask a series of questions of the caller 20 regarding a particular product or service for which the caller seeks help, and based on the responses of the caller, automatically route the call to a particular contact center agent 18 that is identified as having appropriate knowledge of such products or services.

The media server 14 also includes a conference processor 30 that may establish a conference between the agent 18 and other participants at the direction of the contact center agent 18. The conference processor 30 enables the contact center agent 18 to relatively easily connect additional voice paths 26 to the contact center transaction if desired and control mixing of voice signals to determine which participants can hear which other participants. For example, the contact center agent 18 may determine that a problem raised by the caller 20 requires help of a subject matter expert (SME) agent 18 that has highly specialized skills and knowledge in a particular subject matter area. The conference processor 30 enables the contact center agent 18 to relatively easily establish a voice path 26 between the media server 14 and a communications device 22 of the SME agent 18, who may seek additional information from the caller 20. The conference processor 30 includes a voice mixing module that enables the conference processor 30 to mix incoming voice signals from multiple voice paths 26 connected to the conference processor 30 and provide mixed outgoing voice signals to one or more voice paths 26, as directed by the contact center agent 18. Such mixing aspects of the present invention will be described in greater detail herein.

The media server 14 includes a three-dimensional (3D) spatial audio engine (3DSAE) 32, which receives incoming voice signals and aural position data, and modifies the voice signals in order to generate outgoing voice signals that include characteristics, such as phase and frequency information, that positions the outgoing voice signals at an aural position indicated by the aural position data. As will be described in greater detail herein, the 3DSAE 32 is used in conjunction with a user interface 50 on the agent station 16A to enable the contact center agent 18A to aurally position the voice signals associated with participants of a contact center transaction at any desired aural position with respect to the contact center agent 18A.

The media server 14 includes a controller 34 which includes a central processing unit and random access memory (not shown), which is coupled to each of the 3DSAE 32, the IVR processor 28, and the conference processor 30, to control operations thereof. Each of the 3DSAE 32, the IVR processor 28, and the conference processor 30 may comprise a mixture of hardware, software, or firmware. While functionality of the 3DSAE 32, the IVR processor 28, and the conference processor 30 are shown separately for purposes of illustration, the functionality need not be implemented in separate circuitry or modules, and could be combined as desired or appropriate into more or fewer modules. In particular, according to one embodiment of the invention, a single module, or engine, implements functionality described herein as being provided by both the conference processor 30 and the 3DSAE 32. Further, while only a single 3DSAE 32, a single IVR processor 28, and a single conference processor 30 are illustrated in the media server 14, certain of such modules may be duplicated in the media server 14, if necessary, to handle multiple simultaneous contact center transactions. For example, a separate conference processor 30 may be used for each separate contact center transaction being handled by the media server 14.

The agent station 16A includes a controller 36, which may include one or more central processing units and random access memory (not shown), for controlling the overall operation of the agent station 16A. The agent station 16A may also include a storage device, such as a hard drive 38, for permanent storage of certain information, and a communications interface 40 for managing the voice path 26 between the agent station 16A and the media server 14, as well as data communications there between. The agent station 16A includes a display device 42 upon which a user interface (UI) 50 may be displayed and manipulated by the contact center agent 18 during the course of a contact center transaction. Data received from the media server 14 via the communications interface 40 may be used to update the user interface 50. Data generated by the user interface 50 in response to the contact center agent's 18 manipulation of the user interface 50 may be provided to the media server 14 via the communications interface 40.

According to one embodiment of the invention, the contact center agent 18 may manipulate the user interface 50 displayed on the display device 42 to manage certain aspects of a contact center transaction. For example, the contact center agent 18 may use the user interface 50 to add or remove participants from the contact center transaction, connect or disconnect participants to and from a conference associated with the contact center transaction, and aurally position voice signals associated with each participant of the contact center transaction at different aural positions with respect to the contact center agent 18. Through use of 3D spatializer technology provided by the 3DSAE 32, incoming voice signals can be modified to generate outgoing voice signals that contain audio characteristics, such as frequency and phase differences, that aurally position the voice signals at a desired position with respect to the contact center agent 18. The incoming voice signals may be monaural or multichannel. The outgoing voice signals are multi-channel voice signals, such as stereo or Dolby Digital 5.1 voice signals. For example, the contact center agent 18 may aurally position voice signals of the caller 20 on the left side of the contact center agent 18, voice signals of a supervisor of the contact center agent 18 to the front of the contact center agent 18, and voice signals of an SME agent 18 to the right of the contact center agent 18.

In order to accomplish this, the 3DSAE 32 takes incoming voice signals associated with one or more participants, and applies aural position data associated with each of the incoming voice signals to generate multi-channel outgoing voice signals corresponding to the incoming voice signals that include the audio characteristics necessary to position the outgoing voice signals at the designated aural positions. The 3DSAE 32 then mixes the outgoing voice signals to create a combined outgoing voice signal in accordance with the contact center agent's 18 directions. For example, assume that a contact center transaction includes three participants and a contact center agent 18. The 3DSAE 32 may receive voice signals for each of the three participants and the contact center agent 18. The 3DSAE generates multi-channel outgoing voice signals for each of the three participants at designated aural positions, and mixes the three multi-channel outgoing voice signals into a single multi-channel outgoing voice signal that is provided, via the conference processor 30, to the contact center agent 18.

3DSAEs are available from various entities, including DiamondWare, Ltd., 4856 E. Baseline Rd. Ste. 101, Mesa, Ariz. 85206. Studies have established that a human's capacity to assimilate multiple conversations, and identify a particular speaker from a plurality of potential speakers, increases significantly when the voice signals are at different aural positions. In order for the contact center agent 18 to receive multi-channel voice signals, the contact center agent 18 utilizes a multi-channel capable device, such as a headset, or multiple speakers, to listen to the participants of the contact center transaction. The present invention greatly enhances a contact center agent's 18 effectiveness at processing communications from multiple participants during a contact center transaction.

Figure 2:
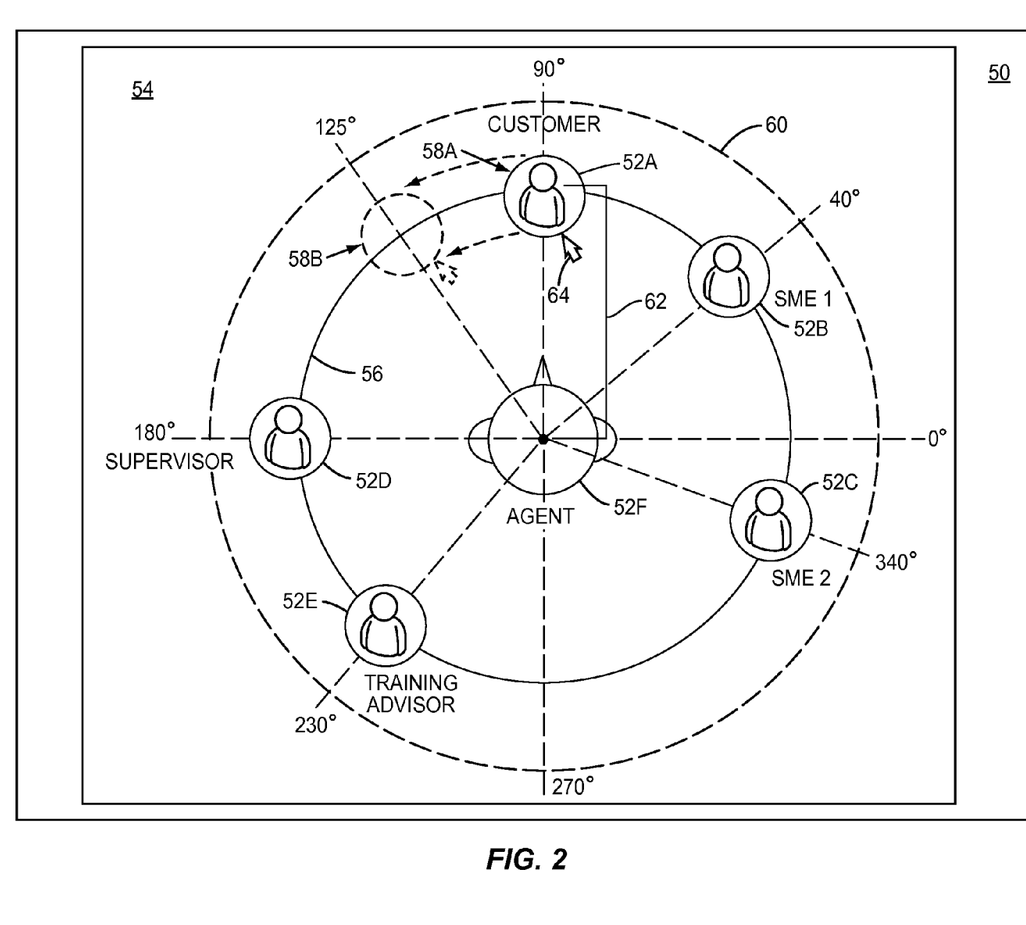
FIG. 2 illustrates a user interface for aurally positioning voice signals of participants of a contact center transaction with respect to a contact center agent according to one embodiment of the invention.

FIG. 2 illustrates a user interface 50 for aurally positioning participant icons 52A-52E of a contact center transaction with respect to the contact center agent 18 (FIG. 1) represented by participant icon 52F according to one embodiment of the invention. The contact center transaction associated with the user interface 50 includes six participants participating in the contact center transaction. Each participant in the contact center transaction is represented in the user interface 50 by a participant icon 52A-52F. In particular, the caller 20 is represented by a customer participant icon 52A, two SME agents 18 are represented by SME participant icons 52B, 52C respectively, a supervisor agent 18 is represented by a supervisor participant icon 52D, a training advisor agent 18 participant is represented by an advisor icon 52E, and the contact center agent 18 managing the contact center transaction is represented by a contact center agent participant icon 52F. For purposes of convenience, the contact center agent participant icon 52F may be referred to herein as the contact center agent icon 52F. The user interface 50 may include a positioning window 54 in which each of the participant icons 52A-52E are positioned. The user interface 50 may include a positioning line 56, illustrated in FIG. 2 in the shape of a circle, which may ease the contact center agents 18 manipulation of one or more of the participant icons 52A-52E within the positioning window 54.

The user interface 50 calculates aural position data for each of the participant icons 52A-52E with respect to the position of the contact center agent icon 52F, and provides such aural position data to the media server 14. The aural position data may comprise any suitable information that can identify a position of a respective participant icon 52A-52E with respect to the contact center agent icon 52F. For example, the aural position data may comprise an angle of the respective participant icon 52A-52E with respect to an orientation of the contact center agent icon 52F, and a distance of the respective participant icon 52A-52E from the contact center agent icon 52F.

Referring to the customer participant icon 52A, assume the customer participant icon 52A is initially at a position 58A. The customer participant icon 52A may have been positioned in such location by default by the user interface 50 upon being informed of a connection of the voice path 26 associated with a caller to the media server 14, or the contact center agent 18 may have, using an input device, such as a mouse, dragged the customer participant icon 52A to the position 58A. In either event, the user interface 50 calculates aural position data identifying the position 58A with respect to the position of the contact center agent icon 52F. Assume that the aural position data will include the angle of offset with respect to an orientation of the contact center agent icon 52F. Assume further that the contact center agent icon 52F has an orientation toward a 90 degree location on a 360 degree circle 60. In other words, the contact center agent icon 52F is "looking" toward the 90 degree mark on the 360 degree circle 60. Thus, the agent icon's "ears" are oriented toward the 180 degree mark and 0 degree mark, respectively. Note that the 360 degree circle 60 is provided for purposes of illustration, and would not necessarily be depicted in the user interface 50.

The user interface 50 determines that the position 58A of the customer participant icon 52A is at a 90 degree position (i.e., straight ahead of the contact center agent icon 52F), and is located a distance 62 from the contact center agent icon 52F. The aural position data thus, in this example, may include the angle, 90 degrees, and the distance 62. As described in greater detail herein, such aural position data is provided to the 3DSAE 32 as control signals so the voice signals associated with the respective participant, in this example the caller 20, may be aurally positioned at the 90 degree position and at a loudness commensurate with the distance 62. In a similar manner, the aural position data is calculated for each of the participant icons 52B-52E and provided to the 3DSAE 32.

Assume that the contact center agent 18, using an input device, selects the customer participant icon 52A by holding down a left mouse button of the input device while a cursor 64 is on top of the customer participant icon 52A, drags the participant icon 52A to position 58B, and then releases the left mouse button. The user interface 50 obtains the new position of the customer participant icon 52A in the positioning window 54, such as by obtaining x,y coordinates of the customer participant icon 52A, and calculates new aural position data, and provides such new aural position data to the 3DSAE 32. The 3DSAE 32 in turn aurally positions the voice signals to be at the approximately 125 degree position (i.e., 35 degrees to the left of where the voice signals were previously aurally positioned) with respect to the contact center agent icon 52F. The contact center agent 18, using stereo headphones for example, now hears the voice of the caller 20 to the left of where the contact center agent 18 previously heard the voice of the caller 20 prior to moving the customer participant icon 52A from the position 58A.

The participant icons 52A-52E, by default, may be initially oriented a uniform distance from the contact center agent icon 52F, for example, along the circle 60. The participant icons 52A-52E may be provided to the user interface 50 at the time the user interface 50 is informed of the presence of a new voice path 26 associated with the respective participant icon 52A-52E. For example, assume that each incoming voice path 26 in the contact center transaction is connected to the conference processor 30, and thus the conference processor 30 anchors the voice paths 26 between the participants' communication device 22 and the media server 14. Assume further that upon connection of a voice path 26 to the conference processor 30, the controller 34, in the media server 14, sends the agent station 16 a message indicating connection of the new voice path 26, as well as identification information associated with the voice path 26.

The identification information may include, for example, a unique voice path identifier that may be used, as described herein, by the user interface 50 to identify the new voice path 26 to which the aural position data is associated. The identification information may also include information that may be used by the user interface 50 to help identify an individual associated with the respective customer participant icon 52A. For example, the controller 34 may know that the new voice path 26 is associated with a caller initiating a new contact center transaction, or with the SME agent 18, based either on information provided by the communications interface 27, or the manner in which the contact center agent 18 connected the new voice path 26 with the conference processor 30. Such information may be provided to the user interface 50 and default icons may be used for different types of participants. For example, if it is known that a participant icon 52A-52E represents a caller, a particular icon may be used by the user interface 50 that differs from the icon used by the user interface 50 for SME agent 18 participants. Alternately or additionally, the participant icons 52A-52E may have modifiable text boxes associated therewith, which the contact center agent 18 may modify to label each participant icon 52A-52E with a respective label, such as "CALLER", "SUPERVISOR", "JANE." The media server 14 may also provide information that may be displayed in conjunction with the participant icons 52A-52E.

The user interface 50 may also provide the contact center agent 18 options for altering the voice signals of a participant in other ways. According to one embodiment, upon right clicking on a participant icon 52A-52E with a mouse, the user interface 50 provides a menu including a "colorize" feature. In response to the contact center agent's 18 selection of the colorize feature, a submenu is displayed in the user interface 50 including a list of colorization options. Such options may include "soprano", "baritone", "tenor", "male", "female", and the like. Upon selection of one of the colorization options, the user interface 50 provides colorization data corresponding to the selected colorization option, and the unique identifier identifying the voice path 26 associated with the selected participant icon 52A-52E to the 3DSAE 32. Thereafter, the 3DSAE 32 can modify the incoming voice signals associated with the corresponding participant to generate outgoing voice signals that include audio characteristics that alter the voice signals to include the characteristics associated with the selected colorization option. For example, if the contact center agent 18 selected a "tenor" colorization option, the voice signals may be modified to be at a higher frequency.

Figure 3:
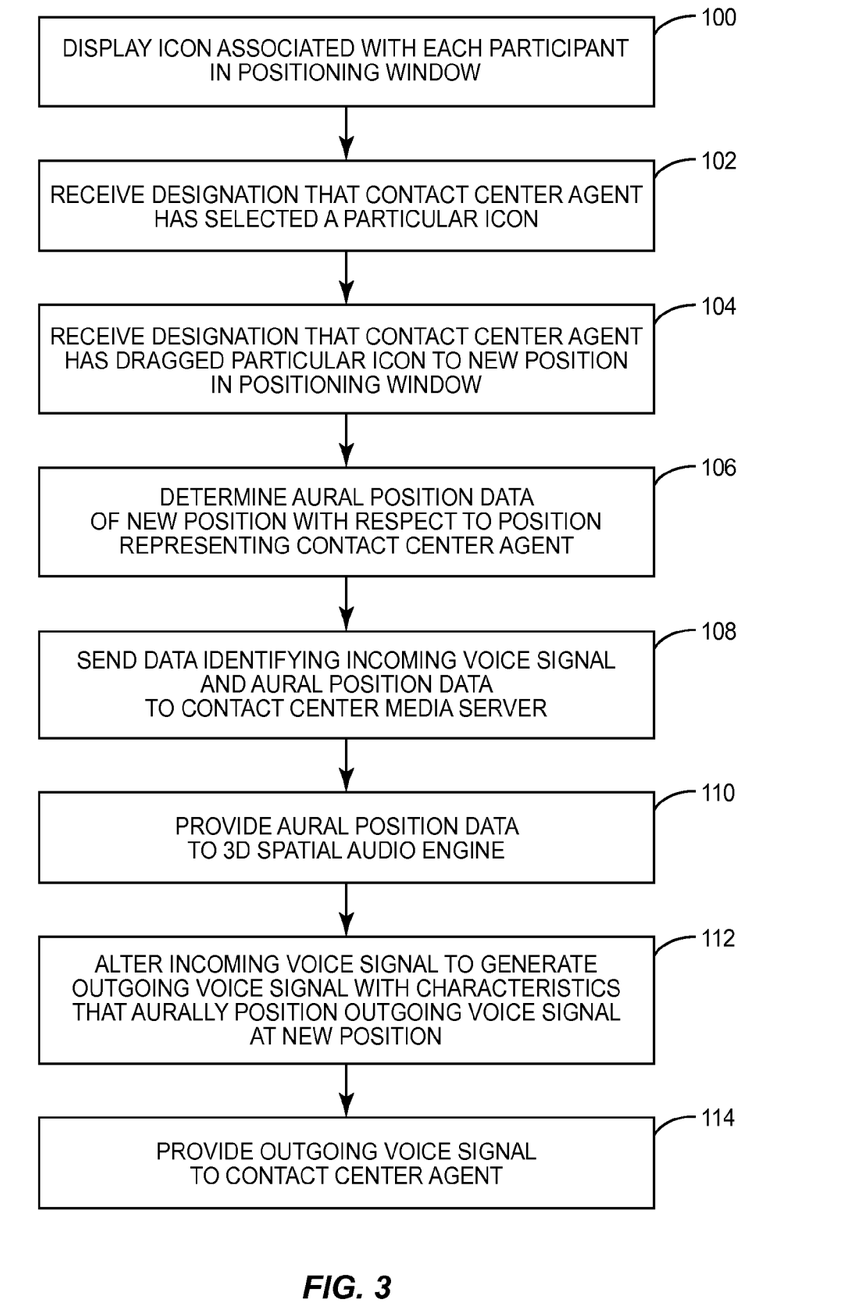
FIG. 3 is a flow diagram for aurally positioning voice signals of participants of the contact center transaction with respect to the contact center agent according to one embodiment of the invention.

FIG. 3 is a flow diagram for aurally positioning voice signals of the participants of the contact center transaction with respect to the contact center agent 18 according to one embodiment of the invention, and will be discussed in conjunction with FIGS. 1 and 2. Initially, the participant icons 52A-52E are displayed in the positioning window 54 (FIG. 2) (step 100).

The user interface 50 then determines that the contact center agent 18 has selected a particular participant icon 52A-52E (step 102). As discussed previously, the contact center agent 18 may use an input device, such as a mouse, keyboard, remote control, or the like, that sends control signals to the user interface 50 indicating selection, deselection, dragging, and other manipulations via the input device. The contact center agent 18 drags the selected participant icon 52A-52E from a first position in the positioning window 54 to a new position in the positioning window 54 (step 104). The user interface 50 determines aural position data associated with the new position of the participant icon 52A-52E (step 106). For example, as discussed previously, the aural position data may include an angular offset of the moved participant icon 52A-52E with respect to the contact center agent icon 52F, and a distance between the participant icon 52A-52E and the contact center agent icon 52F. It should be understood such aural position data is merely exemplary, and the particular aural position data, and format of such position data, may be determined, or dictated, by the particular 3DSAE 32.

While the user interface 50 depicts a two-dimensional space for purposes of illustration, the invention is not limited thereto, and the user interface 50 may depict a three-dimensional space, and the contact center agent 18 may be able to aurally position the participant icons 52A-52E within such space. In such embodiment, the aural position data includes sufficient information to aurally position the voice signals associated with the participant icons 52A-52E in the three-dimensional space. In this manner, for example, the contact center agent 18 may be able to move one participant's voice signals to an aural position that is below and to the left of the contact center agent 18, and move another participant's voice signals above and to the right of the contact center agent 18.

The aural position data determined by the user interface 50 is provided to the media server 14 (step 108). The aural position data can be transmitted from the agent station 16 via the communications interface 40 to the controller 34 using proprietary or conventional messaging protocols, such as, for example, Transmission Control Protocol/Internet Protocol (TCP/IP). The aural position data may include a unique voice path identifier previously provided to the user interface 50 by the media server 14. Alternatively, the controller 34 may determine the voice path 26 associated with the aural position data from data maintained in the media server 14.

The aural position data is provided to the 3DSAE 32 (step 110). The 3DSAE 32 receives the incoming voice signals associated with each voice path 26 from the conference processor 30 and then alters the incoming voice signals to generate outgoing voice signals that include characteristics, such as frequency and phase characteristics, to aurally position the respective voice signals at the aural position indicated by the aural position data (step 112), and then provides the outgoing voice signals to the conference processor 30. The outgoing voice signals are then provided by the conference processor 30 to the contact center agent 18, who listens to such voice signals on a multi-channel communications device, such as a stereo headset, and hears the voices at the designated aural positions (step 114). As will be discussed in greater detail herein, one or more of the voice signals may also be provided to one or more of the other participants of the contact center transaction, as determined by the contact center contact center agent 18.

Figure 4:
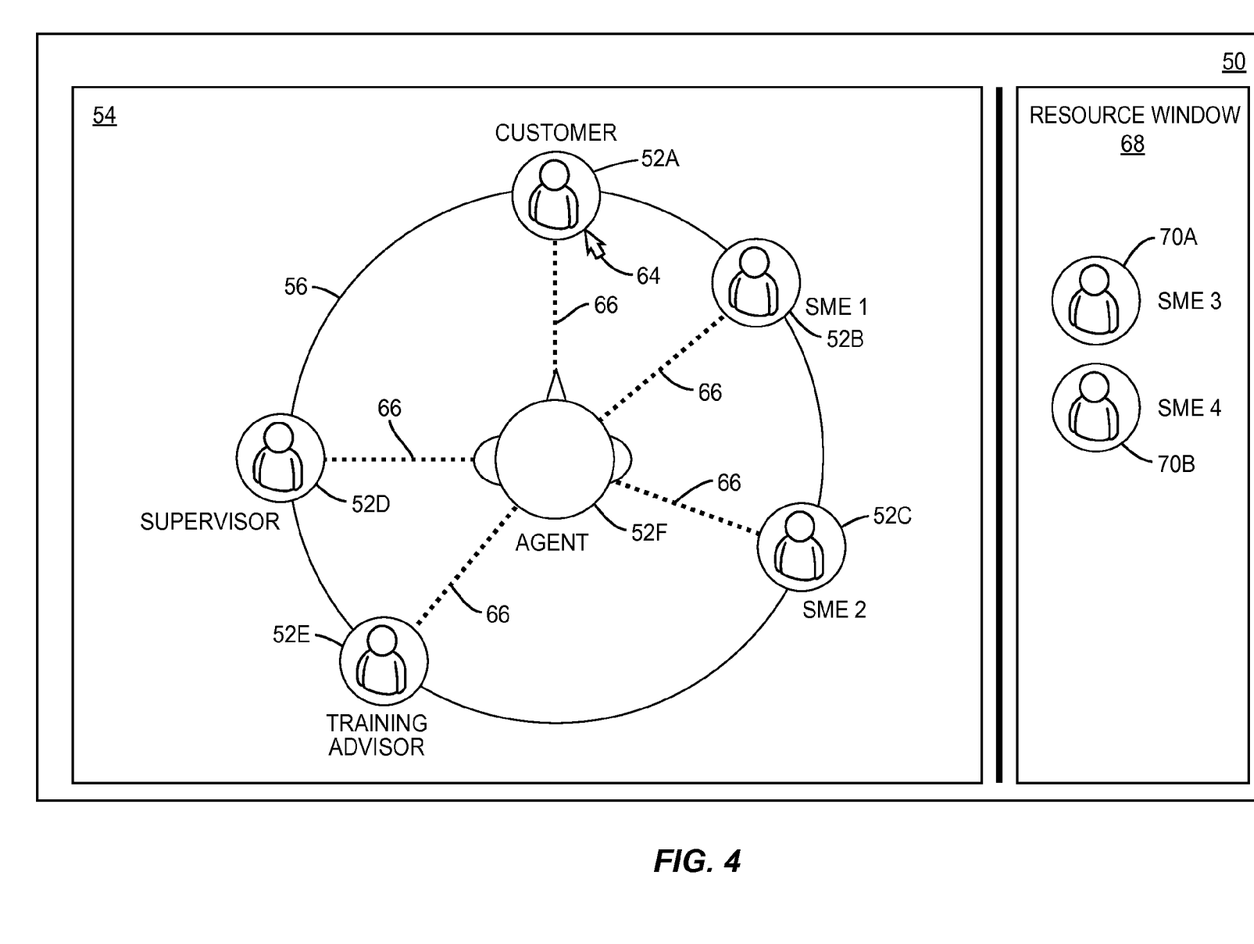
FIG. 4 illustrates a user interface for identifying which of multiple participants in the contact center transaction can hear the contact center agent according to one embodiment of the invention.

FIG. 4 illustrates a user interface 50 that enables the contact center agent 18 to identify which of the multiple participants of the contact center transaction can hear the contact center agent 18 according to one embodiment of the invention. Through manipulation of the user interface 50, the contact center agent 18 can control the mixing of voice signals provided by the conference processor 30 (FIG. 1). The user interface 50 may maintain a state variable for each participant icon 52A-52E that indicates whether the voice signals of the contact center agent 18 are provided to the participant associated with the participant icon 52A-52E or not. The conference processor 30 receives the state information from the user interface 50, and mixes the appropriate incoming voice signals and provides the mixed outgoing voice signals to the appropriate voice paths 26 as directed by the user interface 50. The user interface 50 may display an indication, such as a dotted line 66, between each respective participant icon 52A-52E and the contact center agent icon 52F to indicate to the contact center agent 18 whether or not the participant associated with the respective participant icon 52A-52E is provided the voice signals generated by the contact center agent 18. Thus, as illustrated by the dotted lines 66 in FIG. 4, each of the participants associated with the participant icons 52A-52E can hear the voice of the contact center agent 18. The user interface 50 may enable the contact center agent 18 to easily alter the state of multiple participants simultaneously. For example, double clicking the contact center agent icon 52F may set the state for each participant icon 52A-52E such that all participants can hear the contact center agent 18.

Figure 5:
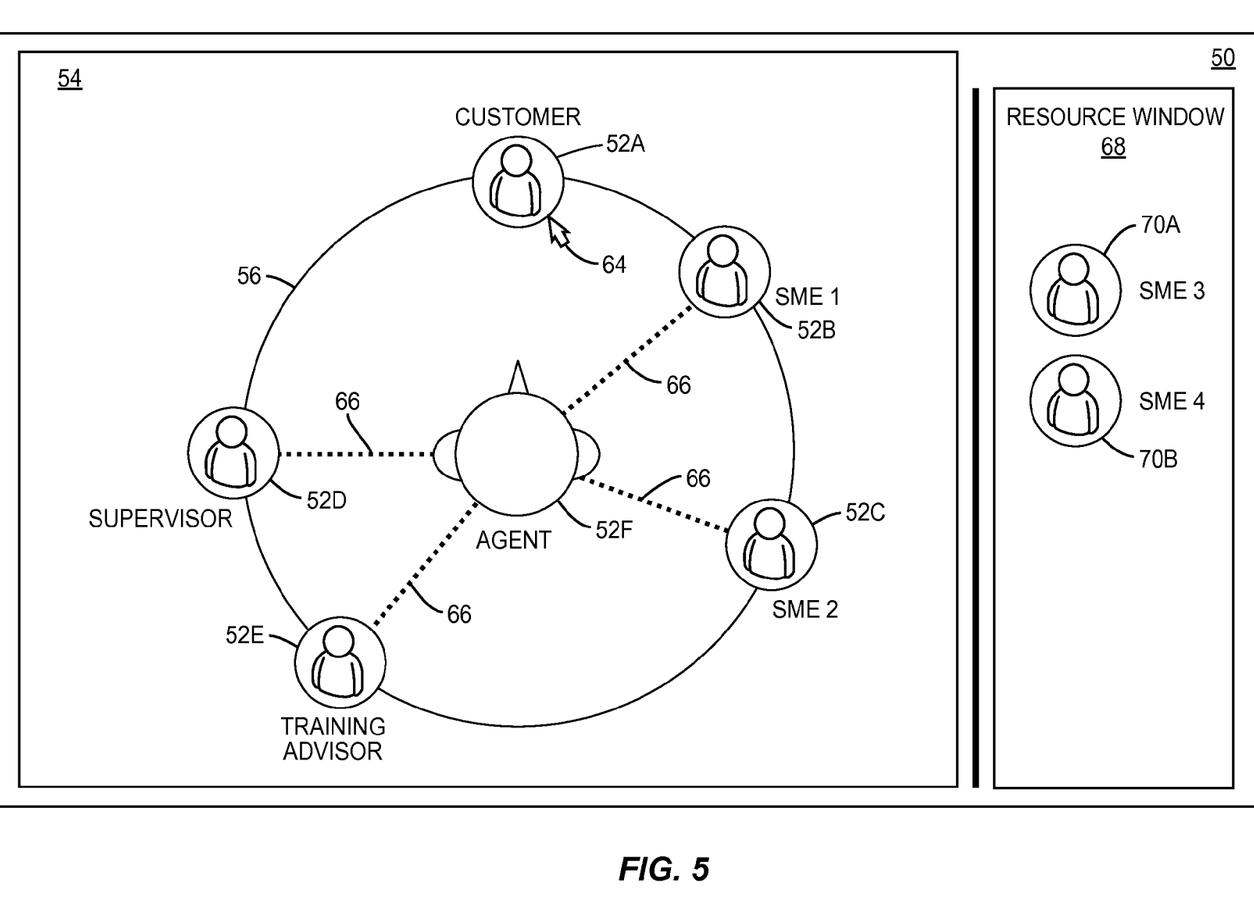
FIG. 5 illustrates the user interface shown in FIG. 4 for identifying which of multiple participants in the contact center transaction can hear the contact center agent according to another embodiment of the invention.

Assume that the contact center agent 18 moves the cursor 64 to a position on or close to the customer participant icon 52A, as illustrated in FIG. 4. The contact center agent 18 may then click, or double click, the mouse to change the state of the variable associated with the customer participant icon 52A. Since the current state of the variable is that the participant associated with the customer participant icon 52A can hear the contact center agent 18, clicking on the participant icon 52A-52E will change the variable state such that the participant cannot hear the contact center agent 18. The user interface 50 communicates the change in the variable state to the conference processor 30, which alters mixing of the voice signals such that the voice signals of the contact center agent 18 are not provided to the voice path 26 of the participant. As shown in FIG. 5, the user interface 50 may also remove the dotted line 66 between the customer participant icon 52A and the contact center agent icon 52F to indicate to the contact center agent 18 that the participant can no longer hear the contact center agent 18.

Referring again to FIG. 4, a resource window 68 may also be provided by the user interface 50 in which additional SME participant icons 70A and 70B are positioned. If needed, the contact center agent 18 may bring one or both SME agents 18 corresponding to the SME icons 70A, 70B into the contact center transaction. For example, assume that the SME agent 18 associated with the SME icon 70A is an SME agent 18 with specialized knowledge of a particular television model. Assume further that the subject of the contact center transaction is an issue relating to that particular television model. The contact center agent 18 has not been successful in resolving the issue. The contact center agent 18, using a mouse, selects and drags the SME icon 70A from the resource window 68 to the positioning window 54. Upon dropping the SME icon 70A at a position in the positioning window 54, the user interface 50 can direct the conference processor 30 to establish a voice path 26 between the SME agent 18 associated with the SME icon 70A. If the conference processor 30 is able to successfully establish the voice path 26 with the SME agent 18, the conference processor 30 sends a message to the user interface 50 identifying the new voice path 26, and the user interface 50 can determine the aural position data associated with the voice signals of the SME agent 18 based on the position in the positioning window 54 of the SME icon 70A in the manner described previously.

Figure 6:
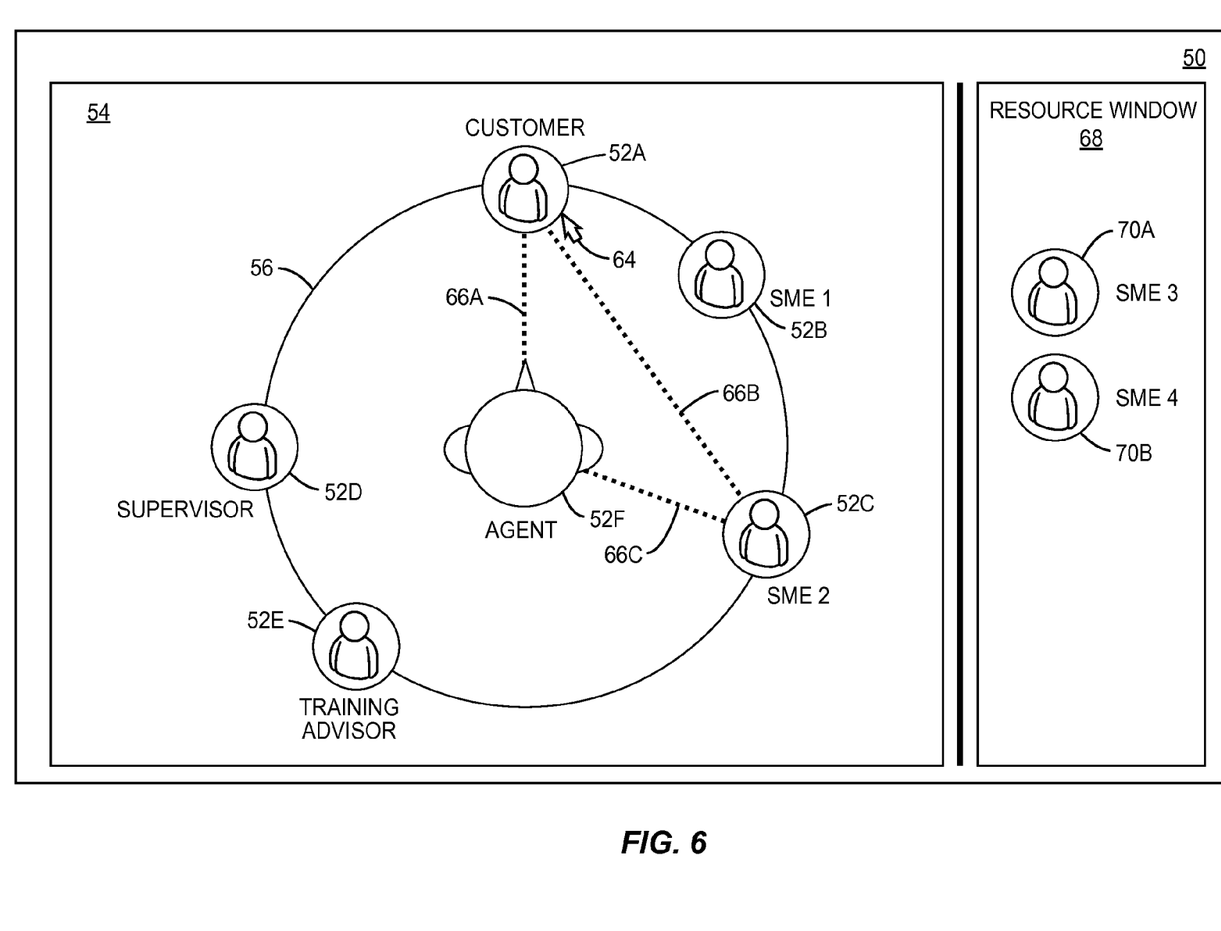
FIG. 6 illustrates a user interface for designating which participants of the contact center transaction are joined in a conference.

FIG. 6 illustrates an additional embodiment of the invention wherein the contact center agent 18 (not shown) can selectively control conference aspects of the invention and control which of the participants can hear other participants. Assume that the contact center agent 18 wishes to join a caller associated with the customer participant icon 52A in a conference with the SME agent 18 associated with the participant icon 52C. As described with regard to FIG. 4, the contact center agent 18 may initially left click on the customer participant icon 52A with the mouse to enable the caller to hear the contact center agent 18. The user interface 50 may display a dashed line 66A to indicate to the contact center agent 18 that the caller can now hear the contact center agent 18. The contact center agent 18 may then left click on the SME agent icon 52C with the mouse to enable the SME agent 18 to hear the hear the contact center agent 18. The user interface 50 may display a dashed line 66B in response. The contact center agent 18 may then right click on the participant icon 52C, and a menu may be displayed in the user interface 50 containing a JOIN option (not shown). Upon selection of the JOIN option by the contact center agent 18, the user interface 50 sends a message to the conference processor 30 to mix the voice signals from the voice paths 26 associated with the caller 20, the contact center agent 18, and the SME agent 18 such that the three participants can hear each other. The user interface 50 may reflect the conference via the dashed line 66C, which extends between the customer participant icon 52A and the SME agent icon 52C.

Figure 7:
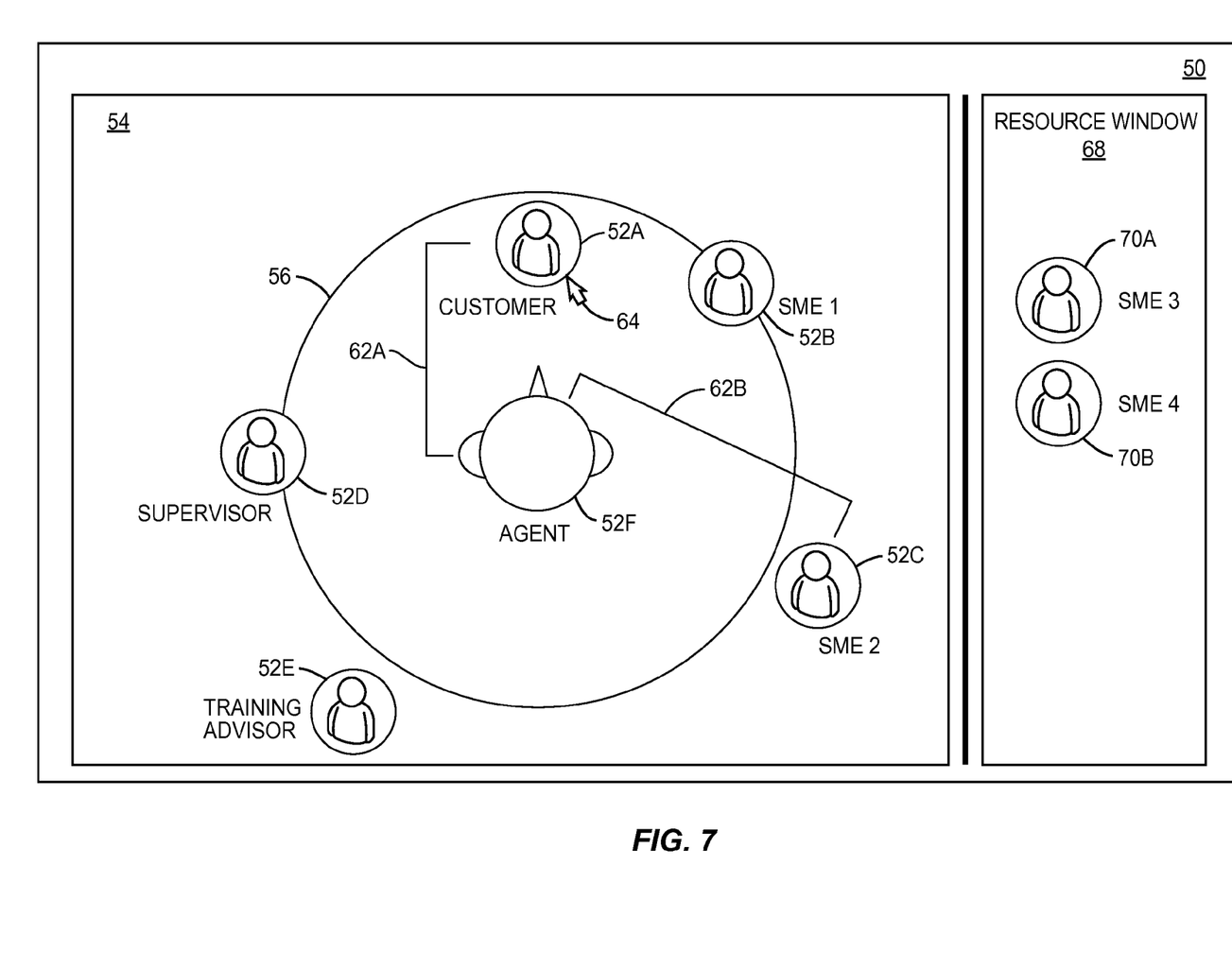
FIG. 7 illustrates the user interface shown in FIG. 4, wherein the contact center agent has aurally positioned a voice signal of a participant farther away with respect to the contact center agent.

FIG. 7 illustrates an embodiment wherein the contact center agent 18 can easily increase or decrease the volume of the participants of the contact center transaction. Assume that the contact center agent 18 cannot hear the caller 20 well. The contact center agent 18, as described previously, may select the customer participant icon 52A associated with the caller 20, and drag and drop the participant icon 52A closer to the contact center agent icon 52F, such that a distance 62A is less than the previous distance between the two icons. The user interface 50 can calculate a new aural position of the customer participant icon 52A with respect to the agent icon 52F. Because the new aural position of the customer participant icon 52A is aurally closer to the agent icon 52F, the 3DSAE 32 can alter the characteristics of the incoming voice signals associated with the caller 20 such that the volume is increased. Similarly, the contact center agent 18 may move the participant icon 52C associated with the SME agent 18 farther from the contact center agent icon 52F such that the distance 62B is greater, to reduce the volume of the SME agent 18.

Figure 8:
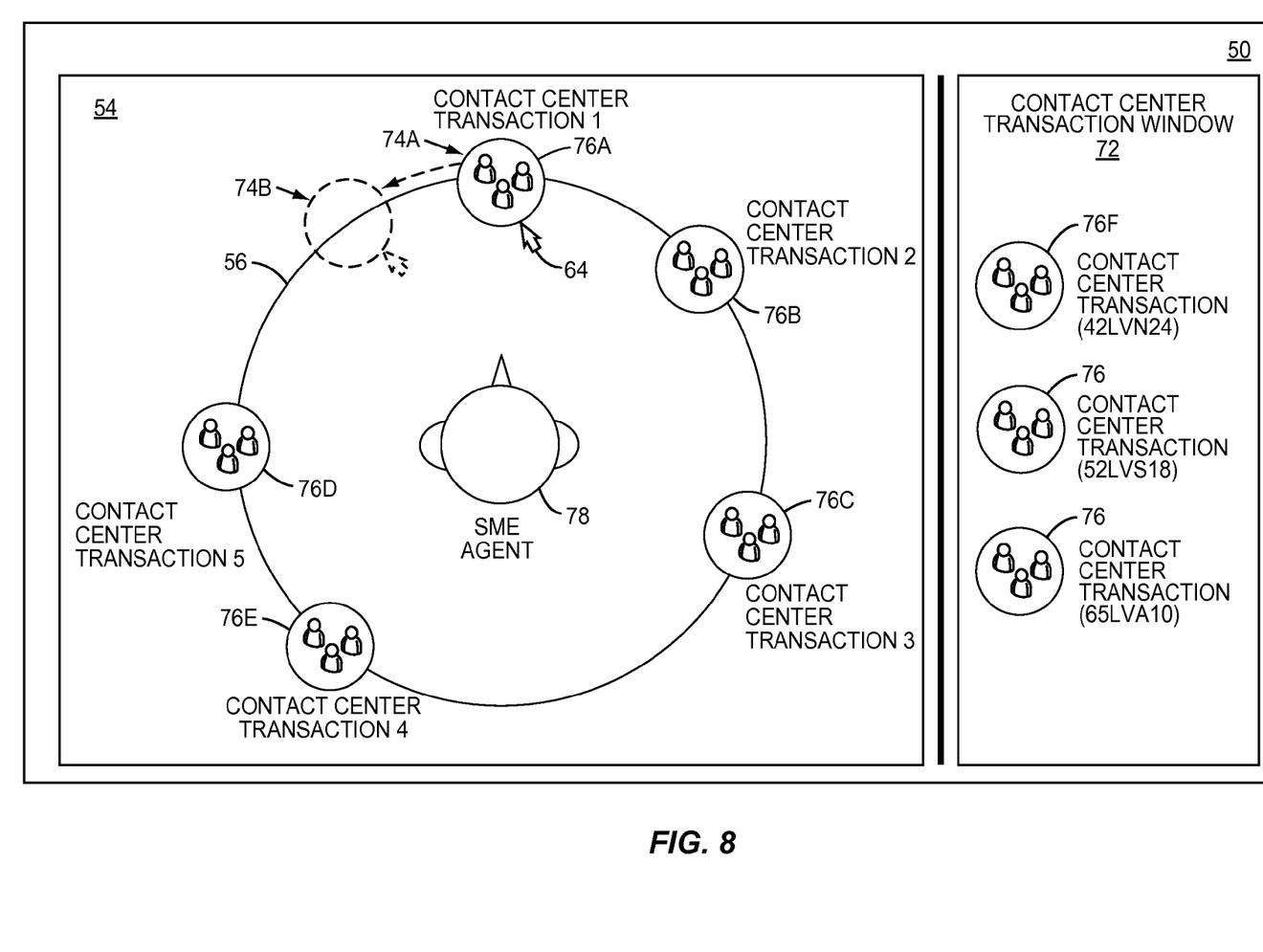
FIG. 8 illustrates a user interface according to another embodiment of the invention, wherein a subject matter expert agent can aurally position voice signals associated with each of a plurality of contact center transactions with respect to a location of the subject matter expert.

FIG. 8 illustrates a user interface according to another embodiment of the invention, where an SME agent 18 can monitor a number of ongoing contact center transactions, and position the voice signals associated with the contact center transactions at designated aural positions. In such embodiment, each time a new contact center transaction is initiated between a contact center agent 18 and a caller 20, the controller 34 of the media server 14 handling the contact center transaction sends a notification of the contact center transaction to the user interface 50 of the SME agent 18, which populates an in-progress contact center transaction window 72 with a contact center transaction icon 76 representing the respective new contact center transaction. The contact center transaction icon 76 may include a label containing a notation about a topic of the call, which may be determined, for example, by the IVR processor 28 during the initial routing process of the call, as discussed previously. For example, the topic of the contact center transaction associated with the contact center transaction icon 76F is designated "42LVN24" which may indicate to the SME agent 18 a particular model of a product for which the contact center provides support. It will be apparent to those skilled in the art that there are a variety of ways to obtain such information.

The SME agent 18 may select one or more contact center transaction icons 76A-76D in the in-progress contact center transaction window 72 and drag them onto the positioning window 54. Upon doing so, a voice path 26 (not shown) is established between the respective conference processor 30 associated with the selected contact center transaction, and the conference processor 30 associated with the SME agent 18. Similarly as described with respect to FIG. 2, the user interface 50 can determine aural position data for the selected contact center transaction based on the location of the associated contact center transaction icon 76 in the positioning window 54 with respect to an SME agent icon 78, and provide such aural position data to the 3DSAE 32. The 3DSAE 32 can then modify the incoming voice signals associated with the contact center transaction to generate an outgoing multi-channel voice signal that includes audio characteristics that position the voice signals of the selected contact center transaction at the designated aural position. The outgoing voice signal can be provided to the SME agent 18. Notably, the 3DSAE 32 may concurrently be providing to the contact center agent 18 handling the transaction a separate outgoing multi-channel voice signal comprising a plurality of participant voice signals at different aural positions as designated by the contact center agent 18. Thus, the 3DSAE 32 is capable of generating a plurality of different outgoing multi-channel voice signals from one or more of the same incoming voice signals, with each outgoing multi-channel voice signal containing one or more of the same incoming voice signals but at different aural positions.

For example, the SME agent 18 may select the contact center transaction icon 76A and drag it from a position 74A to a new position 74B. The user interface 50 can determine the new position 74B of the contact center transaction icon 76A, calculate new aural position data with respect to the SME agent icon 78, and provide the new aural position data to the 3DSAE 32. The 3DSAE 32 will thereafter modify the voice signals associated with the corresponding contact center transaction to generate outgoing voice signals that include characteristics, such as phase and frequency information, that positions the outgoing voice signals at the aural position indicated by the contact center transaction icon 76A. In this manner, the SME agent 18 can easily and intuitively monitor a number of in-progress contact center transactions simultaneously.

Figure 9:
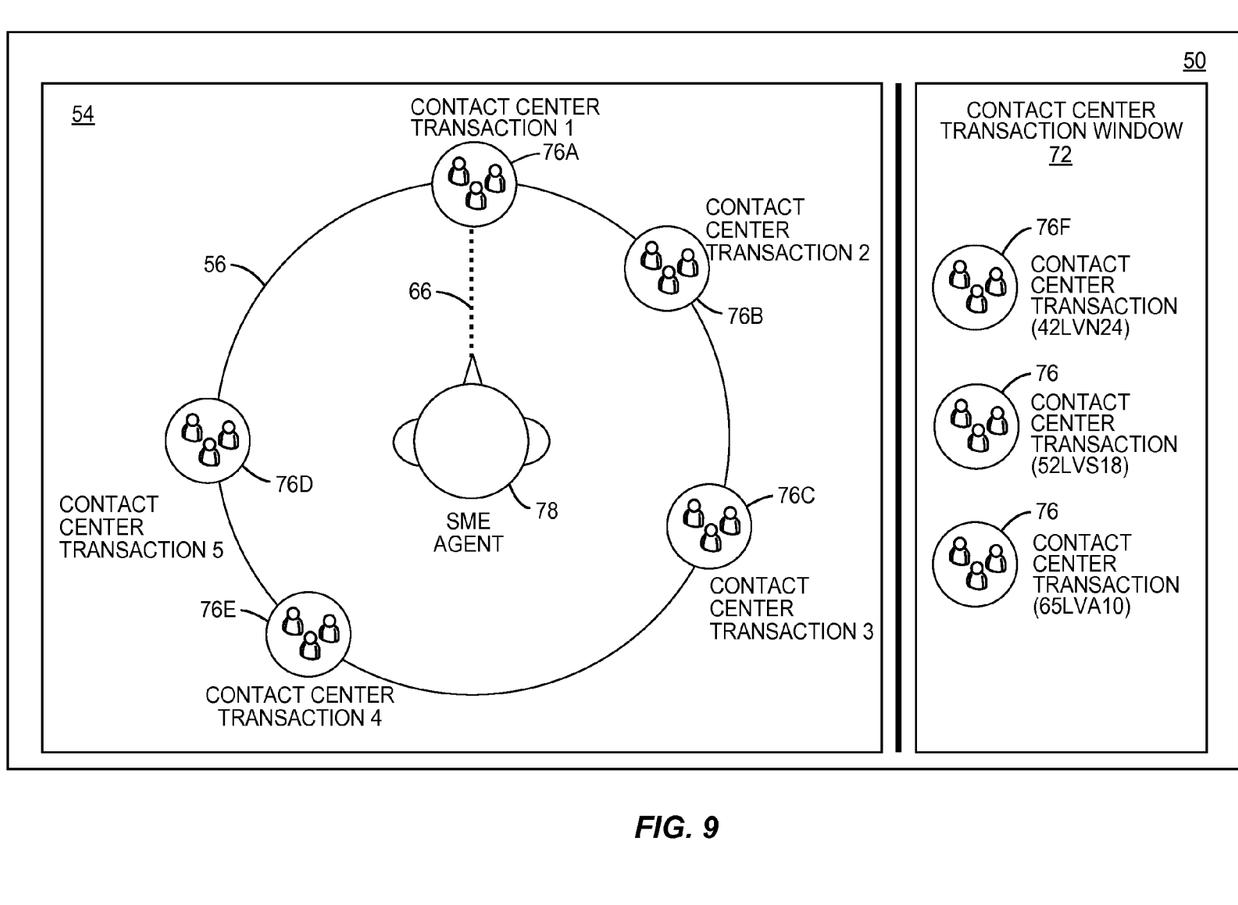
FIG. 9 illustrates the user interface shown in FIG. 8 wherein the subject matter expert can designate that a particular contact center agent can hear the subject matter expert.

FIG. 9 illustrates the user interface 50 illustrated in FIG. 8, wherein the SME agent 18 has decided to initiate a communication with the contact center agent 18 handling a contact center transaction associated with the contact center transaction icon 76A. By clicking on the contact center transaction icon 76A with a mouse, a voice path 26 (not shown) is established between the conference processor 30 associated with the SME agent 18 and the contact center agent 18 handling the selected contact center transaction, thus enabling the SME agent 18 to provide advice to the contact center agent 18 handling the contact center transaction. The contact center agent 18 handling the contact center transaction, using their own user interface 50, can determine, as described previously, which participants of the contact center transaction can hear the SME agent 18. In this manner, the SME agent 18 can quickly and intuitively help resolve problems that may arise in any of a plurality of different contact center transactions.

Various aspects of the present invention may be embodied in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer-readable storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a media server 14, or an agent station 16, for example.

Those skilled in the art will recognize improvements and modifications to the preferred embodiments of the present invention. All such improvements and modifications are considered within the scope of the concepts disclosed herein and the claims that follow.

What is claimed is:

1. A contact center media server comprising:
 a communications interface adapted to interface with a plurality of voice paths, each one of the plurality of voice paths associated with one of a plurality of participants in a contact center transaction;
 a conference processor coupled to a controller and adapted to anchor the plurality of voice paths to the contact center media server; and
 a three-dimensional (3D) spatializer engine adapted to:
  receive a plurality of incoming voice signals, each one of the plurality of incoming voice signals corresponding to one of the plurality of voice paths, and for each of at least some of the plurality of incoming voice signals:
  receive corresponding aural position data designated by a contact center agent; and
  process the each of the at least some of the plurality of incoming voice signals to generate a corresponding outgoing voice signal, wherein the corresponding outgoing voice signal includes signal characteristics that aurally position the corresponding outgoing voice signal at an aural position indicated by the corresponding aural position data; and form a first combined outgoing voice signal comprising each of the outgoing voice signals corresponding to the each of the at least some of the plurality of incoming voice signals.

2. The contact center media server of claim 1 wherein the first combined outgoing voice signal further comprises one of the plurality of incoming voice signals unaltered by aural position data.

3. The contact center media server of claim 2 wherein the conference processor is adapted to provide the first combined outgoing voice signal to a voice path associated with the contact center agent.

4. The contact center media server of claim 2 wherein the 3D spatializer engine is further adapted to receive second aural position data from a second contact center agent, and to create a second combined outgoing voice signal from the plurality of incoming voice signals that aurally position the second combined outgoing voice signal at an aural position indicated by the second aural position data.

5. The contact center media server of claim 1 wherein the corresponding aural position data comprises an angular offset between an orientation of a first icon representing the contact center agent and a position of a second icon corresponding to one of the plurality of participants that generated the each of the at least some of the plurality of incoming voice signals.

6. The contact center media server of claim 5 wherein the corresponding aural position data further comprises loudness data indicating a desired loudness of the corresponding outgoing voice signal.

7. A computer implemented method for aurally positioning voice signals of a contact center transaction comprising:
displaying, in a user interface window on a display device, a plurality of participant icons, each of the plurality of participant icons representing a participant in the contact center transaction, and the each of the plurality of participant icons being displayed at a position in the user interface window that is different from each of others of the plurality of participant icons;
displaying in the user interface window an agent icon, the agent icon representing a contact center agent, the agent icon being displayed at an agent position that is different from a position of the each of the plurality of participant icons;
calculating, for the each of the plurality of participant icons, corresponding aural position data identifying the position of the each of the plurality of participant icons with respect to the agent icon;
providing the corresponding aural position data for the each of the plurality of participant icons to a three-dimensional (3D) spatializer engine; and
receiving, from the 3D spatializer engine, outgoing voice signals associated with the each of the plurality of participants, wherein the outgoing voice signals for the each of the plurality of participants include aural positioning characteristics aurally positioning the voice signals for a corresponding participant at the corresponding aural position.

8. The method of claim 7 further comprising providing the outgoing voice signals to a multi-channel output device for presentation to the contact center agent.

9. The method of claim 8 further comprising receiving selection indication data indicating selection of one of the plurality of participant icons by an input device;
receiving icon movement information indicating a new position in the user interface window to which the one of the plurality of participant icons has been moved;
calculating new aural position data identifying the new position of the one of the plurality of participant icons with respect to the agent icon; and
providing the new aural position data to the 3D spatializer engine.

10. The method of claim 9 further comprising receiving, from the 3D spatializer engine, outgoing voice signals associated with the corresponding participant, wherein the outgoing voice signals includes aural positioning characteristics aurally positioning the outgoing voice signals for the corresponding participant at the new aural position.

11. A computer implemented method for aurally positioning voice signals during a contact center transaction comprising:
displaying in a user interface window on a display device a participant icon representing a participant in a contact center transaction;
displaying in the user interface window an agent icon, the agent icon representing a contact center agent;
calculating for the participant icon aural position data identifying an aural position of the participant icon with respect to the agent icon;
providing the aural position data to a three-dimensional (3D) spatializer engine;
receiving, from the 3D spatializer engine, voice signals associated with the participant, wherein the voice signals include aural positioning characteristics aurally positioning the voice signals associated with the participant at the respective aural position; and
providing the voice signals to a multi-channel output device for presentation to the contact center agent.

12. The computer implemented method of claim 11 further comprising determining that the participant icon has been moved from a first position in the user interface window to a second position in the user interface window, and calculating second aural position data identifying a second aural position of the participant icon with respect to the agent icon, and providing the second aural position data to the 3D spatializer engine.

13. The computer implemented method of claim 11 wherein the aural position data comprises an angular offset between an orientation of the agent icon and loudness data indicating a desired loudness.

14. The computer implemented method of claim 11 further comprising displaying in a second user interface window a subject matter expert (SME) icon, receiving an indication that the SME icon has been moved from the second user interface window to a first user interface window, and initiating a message to a conference processor to establish a voice path between a media server and a device associated with the SME icon.

15. The computer implemented method of claim 14 further comprising:
calculating for the SME icon second aural position data identifying a second aural position of the SME icon with respect to the agent icon;
providing the second aural position data to the 3D spatializer engine;
receiving, from the 3D spatializer engine, second voice signals associated with a SME corresponding to the SME icon, wherein the second voice signals include aural positioning characteristics aurally positioning the second voice signals of the SME at the second aural position.

16. The computer implemented method of claim 11 wherein the aural position data comprises loudness data based on a distance between a position of the participant icon and a position of the agent icon.

17. A method for aurally positioning voice signals in a contact center transaction comprising:
- interfacing with a plurality of voice paths, each one of the plurality of voice paths associated with one of a plurality of participants in a contact center transaction;
- anchoring the plurality of voice paths to a contact center media server; and
- receiving a plurality of incoming voice signals, each one of the plurality of incoming voice signals corresponding to one of the plurality of voice paths, and for each of at least some of the plurality of incoming voice signals:
  - receiving corresponding aural position data designated by a contact center agent; and
  - processing the each of the at least some of the plurality of incoming voice signals to generate a corresponding outgoing voice signal, wherein the corresponding outgoing voice signal includes signal characteristics that aurally position the corresponding outgoing voice signal at an aural position indicated by the corresponding aural position data; and
  - form a first combined outgoing voice signal comprising each of the outgoing voice signals corresponding to the each of the at least some of the plurality of incoming voice signals.

18. The method of claim 17 wherein the first combined outgoing voice signal further comprises one of the plurality of incoming voice signals unaltered by aural position data.

19. The method of claim 18 further comprising providing the first combined outgoing voice signal to a voice path associated with the contact center agent.

20. The method of claim 19 further comprising receiving second aural position data from a second contact center agent, and creating a second combined outgoing voice signal from the plurality of incoming voice signals that aurally position the second combined outgoing voice signal at an aural position indicated by the second aural position data.

* * * * *